United States Patent [19]

Robinson

[11] Patent Number: 4,744,995

[45] Date of Patent: May 17, 1988

[54] PROCESS OF PREPARING MIXED GROUND COMPRESSED FRUIT AND NUT PRODUCTS

[76] Inventor: Eldon L. Robinson, Site 18, Compartment C-40, R.R. #6, Vernon, B. C., Canada, V1T 6Y5

[21] Appl. No.: 5,678

[22] Filed: Jan. 20, 1987

[30] Foreign Application Priority Data

Jan. 24, 1986 [CA] Canada .................................. 500307

[51] Int. Cl.⁴ ............................................. A23L 1/36
[52] U.S. Cl. .................... 426/454; 426/518; 426/632
[58] Field of Search ............... 426/632, 633, 518, 454, 426/448

[56] References Cited

U.S. PATENT DOCUMENTS 3,480,442 11/1969 Atkinson .............................. 426/448
4,670,284 6/1987 Berkoff .................................. 426/518

*Primary Examiner*—George Yeung
*Attorney, Agent, or Firm*—Klarquist, Sparkman, Campbell, Leigh & Whinston

[57] ABSTRACT

A process of preparing an edible mixed ground compressed fruit and nut product comprising: (a) mixing dried fruit and nuts in a receptacle; (b) transporting the fruit and nut mixture from the receptacle into a mixing and grinding device; and (c) transporting the mixed and ground fruit mixture after it has passed through the mixing and grinding device into an extrusion and compression device to thereby form a compressed mixed ground edible fruit and nut product.

9 Claims, 1 Drawing Sheet

PROCESS OF PREPARING MIXED GROUND COMPRESSED FRUIT AND NUT PRODUCTS

FIELD OF THE INVENTION

This invention is directed to an edible fruit and nut product and a method of making same. More particularly, this invention is directed to an edible fruit and nut product which is formed by grinding fruits and nuts simultaneously in a grinding machine and extruding the ground fruit and nut combination as a compressed product which can be packaged in individual packets for sale to a consumer.

BACKGROUND OF THE INVENTION

Various fruits and nuts are popular and nutritious confections for consumers. Fruits and nuts are sold and consumed as a fresh product, or in various preserved forms such as a dried product, a canned product, a frozen product, or a product which is preserved with salt or sugar. Nuts are also consumed in various forms, such as fresh, toasted, dry roasted or sugar coated. Nuts are also consumed in various processed combinations, such as in candy bars or chocolate bars.

Fruits and nuts, although very popular confection items, and extremely nutritious, are not commonly sold in combination. Raisins and peanuts have been sold together in packaged form, but are not widely distributed. A disadvantage with fruits and nuts is that they deteriorate rapidly, unless they are conventionally preserved in some form such as dried, toasted or treated with salt or sugar. A processed fruit and nut product which had long shelf life would be of considerable benefit to the consumer because of the obvious nutrition qualities of fruit and nuts, particularly if the product could be prepared in a form which is attractive to the consumer.

SUMMARY OF THE INVENTION

I have invented a novel, compressed ground fruit and nut product and a method of making same. The product is extremely nutritious, is appealing to the eye, is extremely appealing to the taste and has a long shelf life. Moreover, this appealing product is extremely healthy because it is composed of entirely natural food products, and does not contain any preservatives, additives, or other artificial substances.

The invention is directed to a process of preparing an edible mixed ground compressed fruit and nut product comprising: (a) mixing dried fruit and nuts in a receptacle means; (b) transporting the fruit and nut mixture from the receptacle means into a mixing and grinding means; and (c) transporting the mixed and ground fruit mixture after it has passed through the mixing and grinding means into an extrusion and compression means to thereby form a compressed mixed ground edible fruit and nut product.

In the process, the mixing and grinding means may be an auger mounted inside a chamber. The compression and extrusion means may be an elongated hollow chamber which causes the mixed and ground fruit and nut mixture, after it leaves the auger and chamber means, to assume a compressed and extruded configuration. The fruit and nut mixture may be pre-ground before it is placed in the receptacle means. Supplementary mixing and grinding means may be included in the process between the mixing and grinding means and the extrusion means. The extrusion means may have a general hollow conical configuration, the larger end of the conical extrusion means facing in the direction of and abutting the mixing and grinding means, and the narrow end of the conical extrusion means facing away from the mixing and grinding means.

In the process, a supplementary mixing means may be included in the interior of the hollow conical shaped extrusion means. The supplementary mixing and grinding means may comprise a cutting means which is juxtapositioned adjacent a perforated plate means, the cutting means moving relative to the perforated plate means so as to provide a grinding action between the two means, the perforations being utilized to enable the ground fruit and nut mixture to pass through the first and second plate means.

In the process, an inlet may be included in the hollow chamber to enable a substance to be injected into the chamber.

DRAWINGS

In the drawings which illustrate a specific embodiment of equipment utilized for practising the invention:

DETAILED DESCRIPTION OF A SPECIFIC EMBODIMENT OF THE INVENTION

Figure 1:
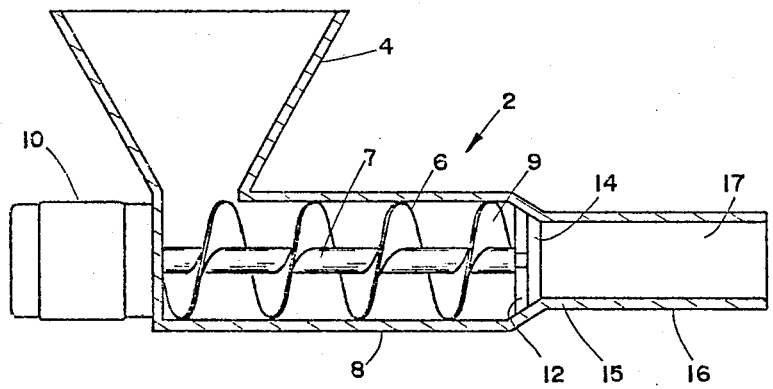
FIG. 1 illustrates a side partial section view of an extruder constructed of a hopper, a screw driving element, an extrusion chamber and a drive motor.

Referring to FIG. 1, the apparatus used for preparing the novel fruit and nut product of the invention comprises an extruder 2, which is constructed to have a hopper 4, a screw 6, a screw chamber 8, a drive motor 10, and an extrusion chamber 16, mounted at the exit end of the screw chamber 8. Optionally, a cutting blade 12 (see FIG. 6 for detail), and a grinding plate 14 (see FIG. 5 for detail) can be mounted at the location between the screw chamber 8 and the extrusion chamber 16. The cutting blade 12 can be affixed to the drive shaft 7 of the screw 6 and rotate with the screw 6 and shaft 7. The grinding plate 14 can be mounted in stationary position at the inlet end of the extrusion chamber 16. Thus, when screw 6 rotates, the cutting blade 12 can rotate relative to the grinding plate 14, and provide a secondary grinding action in addition to the primary grinding action provided by the vanes of the screw 6 as they move against the internal walls of the screw chamber 8.

Screw chamber 8 is circular in cross section to accommodate the shape of the screw 6. However, extrusion chamber 16, while it can be circular in cross section at the inlet end, which mates with the outlet end 9 of the screw chamber 8, need not necessarily be circular in cross-section at the end opposite the end which mates with the screw chamber 8. Outlet end 17 of the extrusion chamber can be constructed to have any desired shape which is efficient or suitable to form a product which is attractive to the consumer. An oval or elongated cross section shape is typical. A hollow constricting cone (not illustrated) can be mounted on the outlet end 17 of the extrusion chamber 16 to provide a more compressed product, if required.

If desirable to modify or enhance the quality of the extruded product, air, liquid, or other solids can be injected under pressure into chamber 8. Also, chamber 8 may be fitted with heaters or vibrators to assist processing of the ground product.

Figure 2:
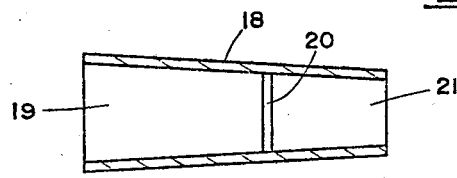
FIG. 2 illustrates a side section view of a conical shape extrusion chamber.

An alternative design of extrusion chamber is illustrated in FIG. 2. In FIG. 2, a conical extrusion chamber 18 is illustrated. In addition, if desired, an optional mixing baffle 20 can be positioned in the interior of the conical extrusion chamber 18. Mixing baffle 20 is typically perforated, or has ports therein which permit the extruded product to pass through the mixing baffle 20. In certain instances, in order to obtain a desired consistency or quality of ground and compressed fruit and nut mixture, mixing baffle 20 may be useful in contributing to the attractiveness of the product.

In addition to mixing baffle 20, or without it, air, liquid, or other substances may be injected under pressure into extrusion chamber 16 or conical extrusion chamber 18 to enhance, modify, or tailor the quality, consistency or taste of the extruded compressed food product. Also, vibrators or heaters can be applied to chambers 16 or 18 to assist processing.

Figure 3:
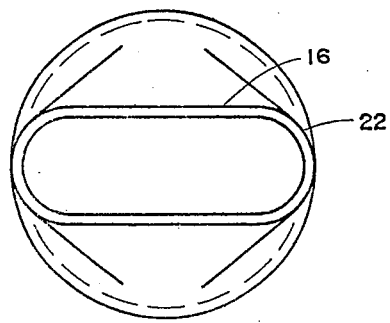
FIG. 3 illustrates an end view of an extrusion chamber.

FIG. 3 illustrates an end view of the outlet end of the extrusion chamber 16. As can be seen, the outlet end has an elongated cross sectional shape, with rounded sides 22. This elongated shape can be utilized to form an edible compressed ground fruit and nut mixture in an extruded bar shape, which can be cut intermittently at desired lengths. The bar sections can then be transported to a wrapping machine which wraps the individual bars in attractive packaging.

Figure 4:
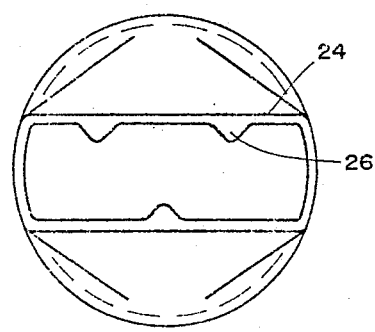
FIG. 4 illustrates an end view of an alternative shape of extrusion chamber.

FIG. 4 illustrates an alternative design of outlet end of an extrusion chamber 24. As can be seen, extrusion chamber 24 has on the internal sides thereof several groove forming ridges 26. These ridges are used to form grooves in the extruded compressed fruit and nut product. In certain situations, it may be considered that a grooved compressed fruit and nut product is more attractive for the consumer. Alternatively, the grooves may be positioned to permit the food product to be readily broken into long bars. It will be recognized, of course, that the outlet end of the extrusion chamber can have any shape or configuration which is deemed desirable to produce a compressed fruit and nut product which has market appeal and is attractive for consumption by a consumer.

Figure 5:
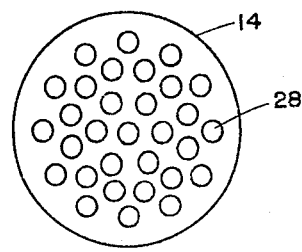
FIG. 5 illustrates an end view of a perforated grinding plate.
Figure 6:
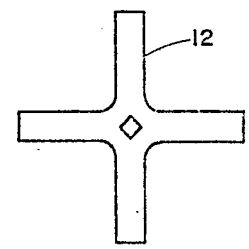
FIG. 6 illustrates a front view of a cutting blade.

FIG. 5 illustrates an end view of a grinding plate 14, with a series of grinding ports 28 formed in the plate 14. These ports 28 enable the compressed and ground fruit and nut product to pass through the plate 14 and enable further processing such as mixing and grinding to be conducted on the compressed fruit and nut product. FIG. 6 illustrates a front view of a cutting blade 12 which rotates against plate 14 and provides additional grinding or cutting action. It will be recognized that use of cutting blade 12 and grinding plate 14, or mixing baffle 20 in the conical extrusion chamber 18, are optional, and their use depends on the degree of grinding and mixing which is deemed desirable in order to form an attractive extruded compressed fruit and nut product suitable for consumption by a consumer.

The extruder 2, which is illustrated in FIG. 1, is used to grind and compress a fruit and nut mixture in order to form an attractive and tasty extruded compressed fruit and nut product. A predetermined mixture of fruit and nuts is poured into hopper 4. The mixture may be preground to a certain extent if deemed desirable. Liquids such as fruit juices or flavourings, or the like, may be added if a modified compressed product is desired. The fruit and nut mixture passes gradually from the hopper 4 into the screw extrusion chamber 8, where the fruit and nut mixture is mixed and ground and transported in the direction of the outlet 9 of the screw chamber 8. As the fruit and nut mixture is carried along by the vanes of the rotating screw 6, a certain amount of grinding action takes place by reason of the action of the vanes of the screw 6 against the internal circular walls of screw chamber 8. Once the ground fruit and nut mixture reaches the outlet end 9 of the screw chamber 8, the mixture passes into the inlet end 15 of extrusion chamber 16. As a general rule, the diameter or interior dimensions of extrusion chamber 16 are smaller than the internal dimensions of screw chamber 8. Accordingly, the ground mixed fruit and nut product is compressed into a product which lends itself to easy packaging, once the compressed product is extruded from the outlet end 17 of the extrusion chamber 16.

In order to obtain additional grinding and mixing action, or to reduce further the size of the fruit and nut components making up the compressed extruded fruit and nut product, cutting blade 12 and grinding plate 14 can be utilized at the location between the outlet end 9 of screw chamber 8 and the inlet end 15 of extrusion chamber 16.

If considered desirable in order to obtain a reasonably highly compressed extruded fruit and nut product, a conical extrusion chamber 18, similar to that illustrated in FIG. 2, can be utilized. The ground and mixed fruit and nut product, as it passes from the inlet end 19 to the outlet end 21, is compressed substantially. In addition, if further mixing or grinding action is required, a mixing baffle 20 can be utilized in the interior of the conical extrusion chamber 18.

I have found that virtually any appealing combination of fruits and nuts can be utilized in the process. For example, dried raisins can be combined with roasted peanuts, dates can be combined with pecans, figs can be combined with brazil nuts, dried apricots can be combined with almonds, pineapple can be combined with hazelnuts, or prunes can be combined with walnuts. For reasons of cost, consumer acceptance, and ready supply of raw materials in North America, Thompson's seedless raisins obtained from California and dry roasted peanuts obtained from any suitable source such as Georgia, will probably be a commonly used mixture in the process. Advantages of the process are that it can be used to produce a compressed ground fruit and nut product, for example, Thompson's seedless raisins and dry roasted peanuts, to produce an attractive edible compressed food product which is extremely nutritious, is appealing to the eye and taste, includes no artificial preservatives or additives, and because the bulk of the natural oil is compressed from the mixed product, has an extremely long shelf life. The extruded compressed fruit and nut mixture can be cut into convenient sizes, for example, a 56 gram (2 oz.) bar, which can be packaged in a suitable paper wrapping machine. A suitable wrapping machine is available in the marketplace under Model PFM 80 SUPER, manufactured by PFM s.r.l., Via Pasubio, 49, 36036 Torrebelvicino (Vicenza), Italy.

In operating the process, it is important that various criteria be followed in order to obtain an attractive edible product. Furthermore, process conditions may vary according to the combination and types of fruit and nuts which are used. As a general rule, if the extruder 2 is operated at too rapid a rate, that is, the screw 6 turns too rapidly, then a coarse, mushy unattractive product may be obtained. On the other hand, if the rate is too slow, then a very fine pasty, unattractive and unpalatable product may be obtained. Similarly, if the compression pressure is too great, then a hard product which is difficult to bite and chew is obtained. Conversely, if extrusion pressures are too low, then the product may be lumpy, coarse, not hold together very well, and not be particularly palatable.

A large number of tests and trials have been conducted to determine the operating parameters and criteria for the process involving various combinations and recipes of fruits and nuts. The following example is indicative of a process and recipe which will provide an attractive product.

EXAMPLE 1

A mixture of fruit and nuts comprising ⅓ dry roasted whole peanuts, and ⅔ Thompson's whole seedless raisins was placed in the hopper of the extruder. The screw was rotated at a rate of 60 rpm. The internal pressure in the extruder was 100 lbs. per sq. in. The peanut and raisin mixture was ground and mixed in the extruder. A ground mixed compressed extruded product was obtained from the outlet end of the extrusion chamber. The extruded product was cut into 56 gram (2 oz.) sizes to provide a convenient size edible product. The extruded product was found to have an attractive consistency in that the raisins were not mushy and the peanuts were ground into particles that were approximately 1/16 in. in dimension. The product was reasonably soft and pliable and could be easily bitten by the teeth into chewable sizes. The product had an extremely attractive flavour. The extruded product was neither mushy, too finely ground, too highly compressed to be easily bitten, nor too loose and crumbly so that it fell apart with handling. It was noted that some of the oil in the peanuts and some of the juice in the raisins was compressed from the mixture as the mixture was being compressed and extruded. The extruded oil and juice was collected in a container. Notwithstanding, the fact that some of the oil and juice was extruded from the compressed product, the compressed product was still moist and extremely tasty.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. A process of preparing an edible mixed ground compressed fruit and nut product comprising:
   (a) mixing dried fruit and nuts in a receptacle means at ambient temperature;
   (b) transporting the fruit and nut mixture from the receptacle means into a primary mixing and grinding means at ambient temperature, the mixing and grinding means comprising a rotatable auger mounted inside a chamber;
   (c) adjusting the rotational speed of the auger to produce an extrudable ground mixture which will maintain its shape after extrusion and have a soft, uniform texture;
   (d) transporting the ground mixture after it has passed through the mixing and grinding means into an extrusion and compression means; and
   (e) adjusting the pressure generated by the extrusion and compression means to form a compressed fruit and nut product having a uniform shape and soft texture with sufficient moisture to maintain its shape after extrusion, said mixture being maintained at ambient temperature during extrusion.

2. A process as defined in claim 1 wherein the compression and extrusion means is an elongated hollow chamber which causes the mixed and ground fruit and nut mixture, after it leaves the auger and chamber means, to assume a compressed and extruded configuration.

3. A process as defined in claim 1 wherein the fruit and nut mixture is pre-ground before it is placed in the receptacle means.

4. A process as defined in claim 1 further comprising a secondary mixing and grinding means positioned between said primary mixing and grinding means and said extrusion and compression means, said primary and secondary mixing and grinding means cooperating to produce an extrudable ground mixture.

5. A process as defined in claim 1 wherein the extrusion means has a general hollow conical configuration, the larger end of the conical extrusion means facing in the direction of and abutting the primary mixing and grinding means, and the narrow end of the conical extrusion means facing away from the primary mixing and grinding means.

6. A process as defined in claim 5 wherein a supplementary mixing means is included in the interior of the hollow conical shaped extrusion means.

7. A process as defined in claim 4 wherein the secondary mixing and grinding means comprises a cutting means which is juxtapositioned adjacent a plate means having perforations therein, the cutting means moving relative to the plate means so as to provide a grinding and cutting action between the two means, the perforations being utilized to enable the ground fruit and nut mixture to pass through the plate means.

8. A process as defined in claim 2 wherein an inlet is included in the hollow chamber to enable a substance to be injected into the chamber.

9. A process of preparing an edible mixed ground compressed fruit and nut product comprising:
   (a) preparing a fruit and nut mixture comprising shelled peanuts and raisins;
   (b) placing said mixture in a receptacle means at ambient temperature;
   (c) transporting the fruit and nut mixture from the receptacle means into a primary mixing and grinding means at ambient temperature, the mixing and grinding means comprising a rotatable auger mounted inside a chamber;
   (d) adjusting the rotational speed of the auger to about 60 rpm;
   (e) transporting the mixture after it has passed through the mixing and grinding means into an extrusion and compression means;
   (f) maintaining the pressure generated by the extrusion and compression means at about 100 psi; and
   (g) extruding the mixture at ambient temperature to form a compressed fruit and nut product having uniform shape and soft texture with sufficient moisture to maintain its shape after extrusion.

* * * * *